(12) United States Patent
Mazzoni

(10) Patent No.: US 9,577,696 B2
(45) Date of Patent: Feb. 21, 2017

(54) TABLET HOLDING DEVICE

(71) Applicant: Alan Mazzoni, Baltimore, MD (US)

(72) Inventor: Alan Mazzoni, Baltimore, MD (US)

( * ) Notice: Subject to any disclaimer, the term of this patent is extended or adjusted under 35 U.S.C. 154(b) by 0 days.

(21) Appl. No.: 14/935,944

(22) Filed: Nov. 9, 2015

(65) Prior Publication Data

US 2016/0191098 A1    Jun. 30, 2016

Related U.S. Application Data

(60) Provisional application No. 62/097,334, filed on Dec. 29, 2014.

(51) Int. Cl.
*A45F 5/00* (2006.01)
*H04B 1/3888* (2015.01)
*F16M 13/04* (2006.01)

(52) U.S. Cl.
CPC ............... *H04B 1/3888* (2013.01); *A45F 5/00* (2013.01); *F16M 13/04* (2013.01)

(58) Field of Classification Search
CPC ............................... A45F 5/00; A45F 2200/05
USPC ........................ 455/575.1, 90.3, 575.6, 556.1
See application file for complete search history.

(56) References Cited

U.S. PATENT DOCUMENTS

| | | | |
|---|---|---|---|
| 4,410,158 A | 10/1983 | Maffei | |
| 6,685,024 B1 | 2/2004 | Matthews | |
| 8,353,491 B2 | 1/2013 | Mezue | |
| 2009/0189039 A1 | 7/2009 | LaBuda | |
| 2011/0121148 A1* | 5/2011 | Pernia | B60R 11/0229 248/207 |
| 2012/0273637 A1* | 11/2012 | Huang | F16M 11/041 248/291.1 |
| 2012/0292463 A1* | 11/2012 | Burns | F16M 11/041 248/125.8 |
| 2013/0206935 A1* | 8/2013 | Majid | F16M 11/041 248/124.1 |
| 2014/0203152 A1 | 7/2014 | Prohofsky et al. | |

* cited by examiner

*Primary Examiner* — John J Lee
(74) *Attorney, Agent, or Firm* — Global Intellectual Property Agency, LLC; Daniel Boudwin

(57) ABSTRACT

A tablet holding device for allowing a user to view a mobile electronic device while lying in a supine position. The tablet holding device includes a base portion and an upper portion securable thereto, wherein the base portion and upper portion form a cavity in which the user can position his or her head. The base portion is shaped so as to support a pillow thereon or may include padding thereon. The upper portion is positioned directly above the base portion and includes a fastener on a front end thereof for securing a mobile electronic device in position for a user lying on the base portion to view. The tablet holding device may further include an audio unit having a microprocessor, speakers, and a wireless transceiver for communicating with a mobile electronic device so as to play audio from said mobile electronic device.

8 Claims, 4 Drawing Sheets

TABLET HOLDING DEVICE

CROSS REFERENCE TO RELATED APPLICATION

This application claims the benefit of U.S. Provisional Application No. 62/097,334 filed on Dec. 29, 2014. The above identified patent application is herein incorporated by reference in its entirety to provide continuity of disclosure.

BACKGROUND OF THE INVENTION

Field of the Invention

The present invention relates to mobile electronic device holding apparatuses. More specifically, the present invention provides a tablet holding device comprising a base portion on which a user can position his or her head, and an upper portion securable to the base portion which includes a fastener for holding a tablet in a position above the head of the user. In this way, the user can lie on his or her back and can view the tablet positioned above his or her head in order to comfortably view the tablet in a hands-free manner.

People enjoy watching movies, television shows, video clips, and various other media on their mobile electronic devices, such as smartphones, tablets and the like. In order to watch videos on a mobile electronic device, a person must hold the device in his or her hand in order to position the device at a desired viewing angle. However, holding the mobile electronic device in a position for viewing can be inconvenient and is not a suitable option when the user is watching a longer video, such as a movie.

As a result, people often attempt to position their mobile electronic device at an angle or lean the device against a surface. By using various objects to prop up the mobile electronic device, the user may be unable to achieve a desired viewing angle, and the mobile electronic device may not remain in the desired position. Further, the mobile electronic device may fall and be damaged if not properly secured at a desired viewing position. Accordingly, a device for allowing a user to lie down while supporting the mobile electronic device overhead in a position for viewing is desired.

Devices have been disclosed in the prior art that relate to mobile electronic device holders. These include devices that have been patented and published in patent application publications. Some devices in the prior art provide a means for holding and supporting mobile electronic devices. U.S. Published Patent Application Number 2014/0203152, U.S. Pat. No. 8,353,491, U.S. Published Patent Application Number 2009/0189039 provide devices for holding and supporting mobile electronic devices. Other devices relate to television supports, such as U.S. Pat. No. 4,410,158, and some devices provide support pillows, such as U.S. Pat. No. 6,685,024.

These prior art devices have several known drawbacks. The devices in the prior art fail to provide a tablet holding device adapted to hold a tablet above a user's head when the user is lying in a supine position. Such devices do not provide a base portion having a pillow thereon and an upper portion to which a tablet or similar device can be removably fastened. Thus, the devices in the prior art do not allow a user to lie down and watch videos on the tablet in a hands-free manner.

In light of the devices disclosed in the prior art, it is submitted that the present invention substantially diverges in design elements from the prior art and consequently it is clear that there is a need in the art for an improvement to existing tablet holding devices. In this regard the instant invention substantially fulfills these needs.

SUMMARY OF THE INVENTION

In view of the foregoing disadvantages inherent in the known types of tablet holding devices now present in the prior art, the present invention provides a new tablet holding device wherein the same can be utilized for providing convenience for the user when viewing a tablet while lying in a supine position.

It is therefore an object of the present invention to provide a tablet holding device comprising a base portion on which a user can position his or her head, and an upper portion secured to said base portion that is adapted to removably secure a tablet or other mobile electronic device in position for viewing.

It is another object of the present invention to provide a tablet holding device comprising a base portion having padding thereon so as to serve as a pillow.

Another object of the present invention is to provide a tablet holding device comprising a base portion and an upper portion that forms a cavity in which a user can position his or her head.

Yet another object of the present invention is to provide a tablet holding device comprising an audio unit having a microprocessor, one or more speakers, and a wireless transceiver for wirelessly communicating with a mobile electronic device so as to play audio from said device.

Another object of the present invention is to provide a tablet holding device that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1A:
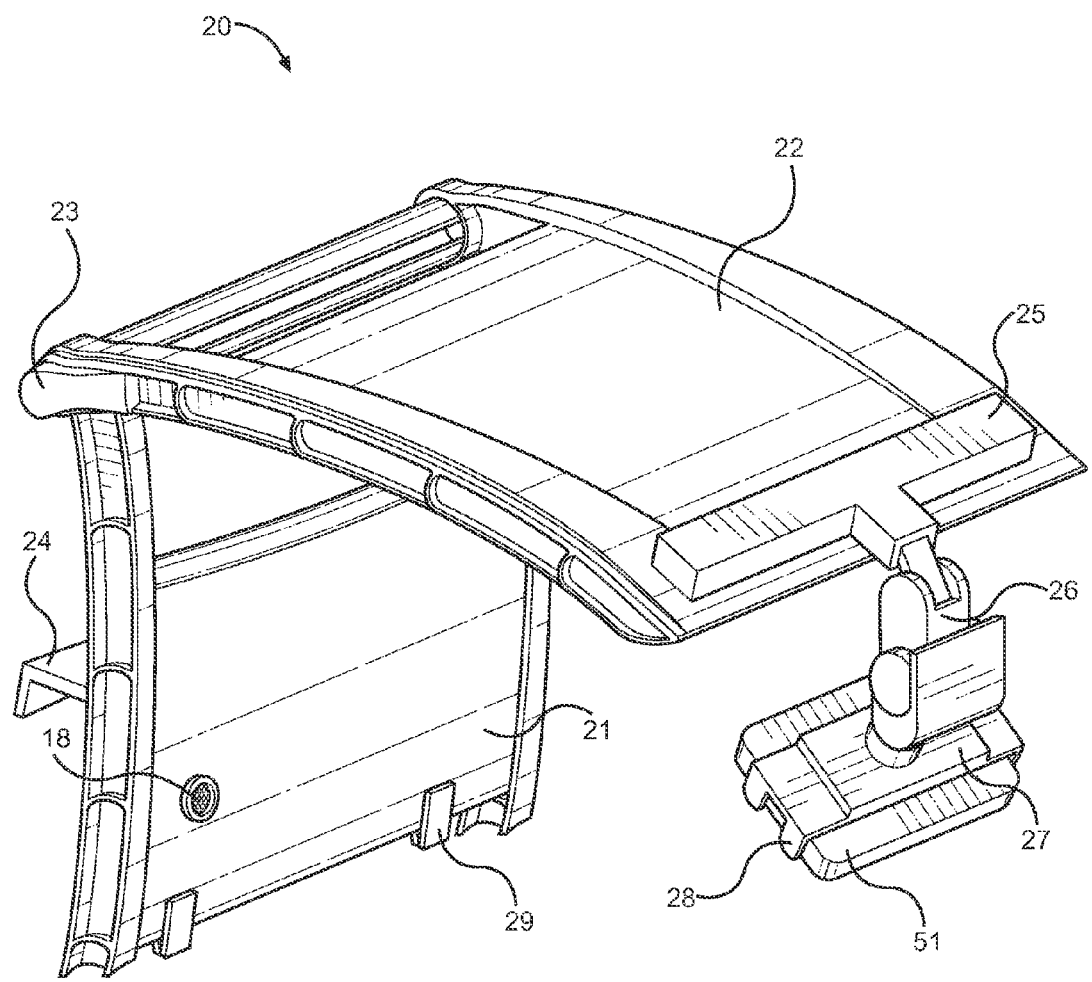
FIG. 1A shows a perspective view of the tablet holding device.

Reference is made herein to the attached drawings. Like reference numerals are used throughout the drawings to depict like or similar elements of the tablet holding device. For the purposes of presenting a brief and clear description of the present invention, the preferred embodiment will be discussed as used for holding a tablet in a desired position for viewing while the user is lying in a supine position. The figures are intended for representative purposes only and should not be considered to be limiting in any respect.

Figure 1B:
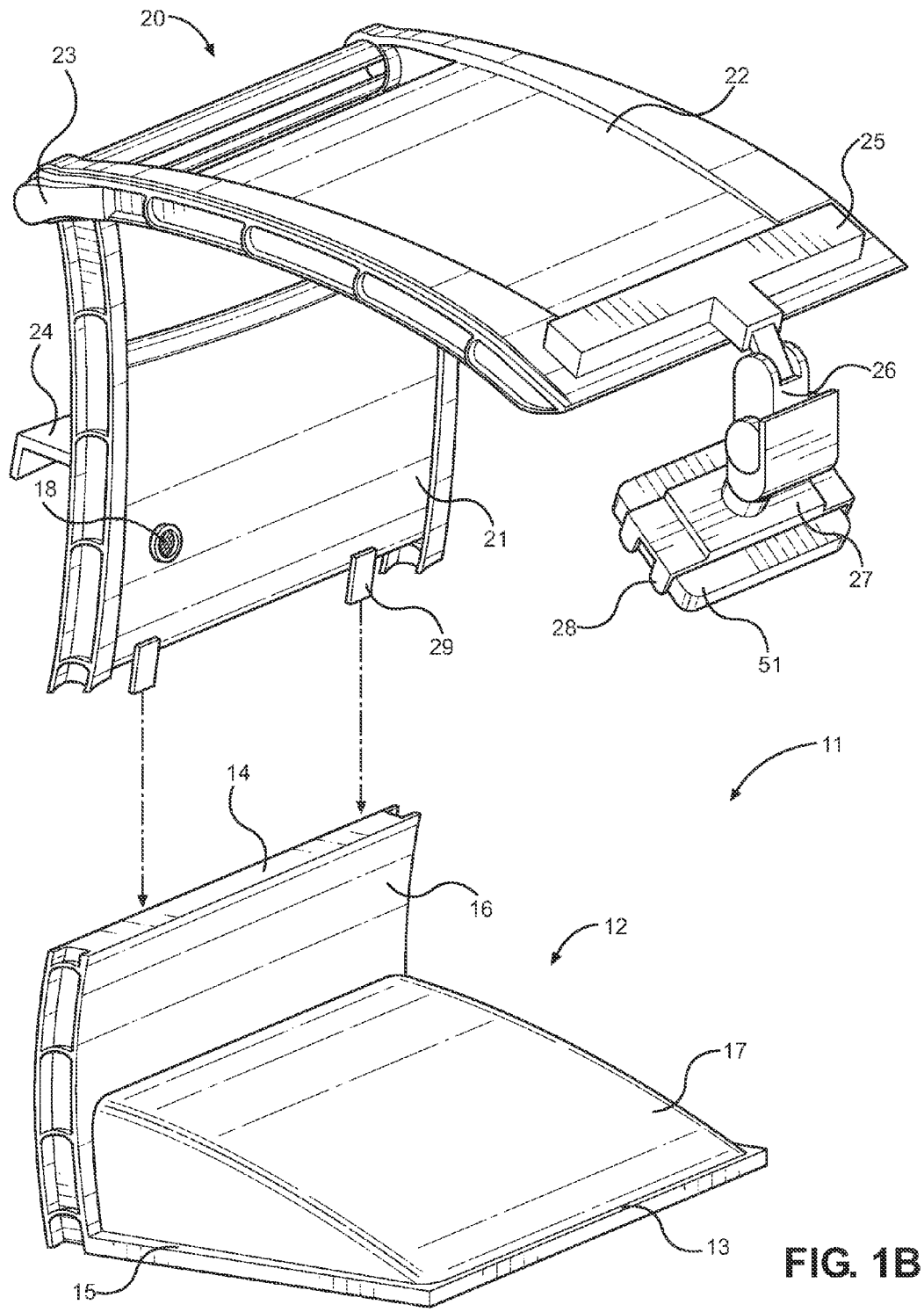
FIG. 1B shows a perspective view of the base portion and upper portion of the tablet holding device.

Referring now to FIGS. 1A and 1B, there are shown perspective views of the tablet holding device. The tablet holding device 11 comprises a base portion 12 and an upper portion 20. In some embodiments, the base portion 12 and upper portion 20 are permanently affixed to one another so as to form a unitary body. In alternate embodiments, such as the embodiment shown in FIG. 1A, the base portion 12 and upper portion 20 are removably securable to one another. In this way, the base portion 12 can be used alone as a pillow or headrest, or the upper portion 20 can be secured to an alternate support surface so that the user can view a tablet in a hands-free manner.

In the illustrated embodiment, the base portion 12 comprises a base panel 15 having a front end 13 and a rear end 14. The first panel 15 is arranged horizontally so that it can be disposed on a support surface, such as the floor, a bed, or a sofa, among other similar areas. A rear panel 16 is affixed to the rear end 14 of the base panel 14 and is arranged in a vertical orientation so that it is perpendicular to the base panel 15. In some embodiments, the base portion 12 further comprises one or more sides extending from the front end 13 of the base panel 15 towards the rear end 14 thereof.

The base portion 12 is sized so as to receive a pillow thereon, so that the user can lie in a face-up position while viewing his or her tablet or mobile electronic device. In alternate embodiments, the base portion 12 includes padding 17 thereon so as to serve as a pillow. In one embodiment, the padding 17 is composed of a composite foam and includes curved contours that correspond with the neck and head of a user. In this way, the padding 17 is integral to the construction of the base portion 12, and the user does not have to provide a pillow.

In some embodiments, the tablet holding device 11 further includes an audio unit, wherein the audio unit comprises one or more speakers 18 integrated into the base portion 12 or the upper portion 20, depending upon the embodiment. Preferably, the audio unit and speakers 18 are positioned on a lower panel 21 of the upper portion 20 so that the upper portion 20 can be used without the base portion 12, wherein the user can still utilize the audio unit. The audio unit is adapted to wirelessly communicate with a mobile electronic device supported by the tablet holding device 11 so that the speakers 18 can play audio from the mobile electronic device.

The upper portion 20 comprises an upper panel 22 and a lower panel 21. The upper panel 22 is pivotally affixed to the lower panel 21 via a hinge 23 at a rear end thereof. Preferably, the lower panel 21 is arranged substantially vertically and the upper panel 22 is positioned horizontally or at a slight incline. In this way, the upper panel 22 can move relative to the second lower 21. The lower panel 21 of the upper portion 20 is adapted to be removably affixed to the rear panel 16 of the base portion 12. The lower end of the lower panel 21 of the upper portion 20 comprises one or more fasteners 29 thereon. In the illustrated embodiment, the fasteners 29 are clamps, however in alternate embodiments the fasteners may include clips, brackets, or other suitable fastening devices. The upper portion 20 and base portion 12 may further be removably secured via interlocking fasteners depending upon the embodiment. The fasteners 29 can be removably engaged with the upper end of the rear panel 16 of the base portion 12 so that the second panel 21 of the upper portion 20 and the second panel 16 of the base portion 12 comprise a continuous surface and are both oriented vertically.

The lower panel 21 of the upper portion 20 comprises a hook 24 thereon that extends outwardly from the rear of the lower panel 21. The hook 24 is preferably oriented downwardly. The hook 24 is adapted to be positioned over the upper end of the headboard of a bed, or can be disposed on another similar support surface such that the second panel 21 is arranged vertically and the first panel 22 is arranged in a horizontal orientation. Thus, the upper portion 20 can be affixed to a support surface rather than to the base portion 12, allowing the upper portion 20 to be used alone. The hook 24 removably secures the upper portion 20 onto a support surface so that the user can view the mobile electronic device supported thereon.

The upper panel 22 of the upper portion 20 comprises a mobile electronic device holder 25 on a front end thereof. The mobile electronic device holder 25 comprises an arm 26 pivotally attached to a front end of the upper portion 20. The arm 26 comprises a support 27 thereon having a plurality of fingers 28. The back surface of a mobile electronic device, such as a tablet computer, can be placed flush against the support 27, and the fingers 28 are adjustably positioned so as to grasp the edges of the mobile electronic device 51. In this way, the mobile electronic device is secured on the electronic device holder 25 and can be moved into a desired viewing position by adjusting the arm 26. The mobile electronic device 51 is held so that it faces towards the rear end of the device 11.

The upper panel 22 further includes various additional features depending upon the embodiment. The upper panel 22 may include a cord management device for allowing the user to organize any cords or cables extending from the mobile electronic device 51 held by the tablet holding device 11. Further, the upper panel 22 may include a charging device adapted to provide electricity to the tablet 51 held by the tablet holding device 11.

Figure 2:
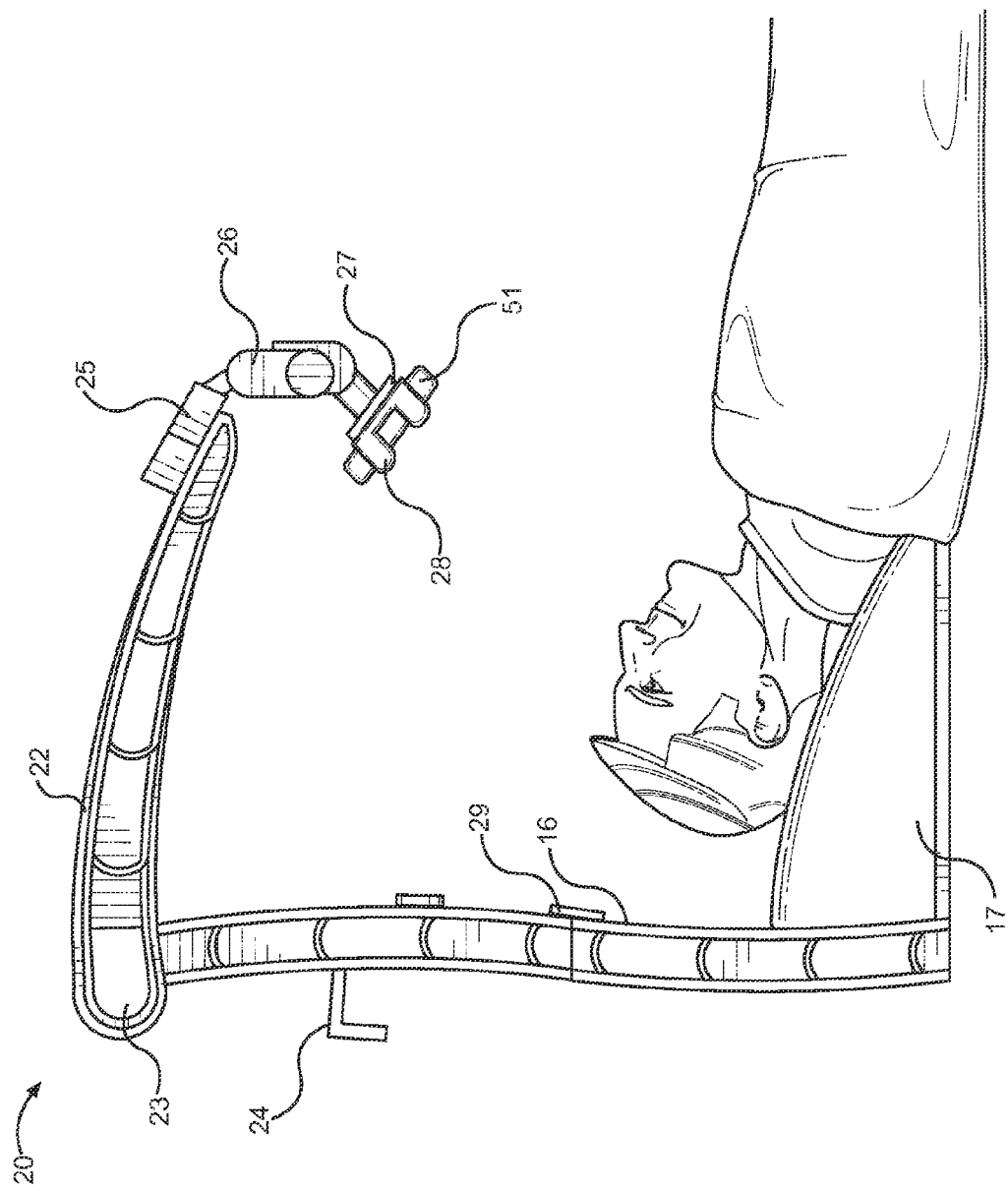
FIG. 2 shows a side view of the tablet holding device in use.

Referring now to FIG. 2, there is shown a side view of the tablet holding device. The upper panel 22 of the upper portion 20 is positioned directly above the base portion 12 when the upper portion 20 is secured thereto. In this way, the securement of the upper portion 20 to the base portion 12 forms a cavity in which the user's head can be positioned. The upper portion 20 overhangs the base portion 12 such that the front end of the upper portion 20 is directly above the front end of the base portion 12.

The mobile electronic device holder 25 is adapted to secure a tablet 51 or similar device in a position for viewing. Preferably, the mobile electronic device holder 25 is adapted to hold the tablet 51 in a substantially vertical position or at a slight angle relative to a vertical plane so as to direct the tablet towards the user lying on the base portion 12. In this way, the mobile electronic device holder 25 secures the tablet 51 in position for viewing without the need for the user to hold the device.

Figure 3:
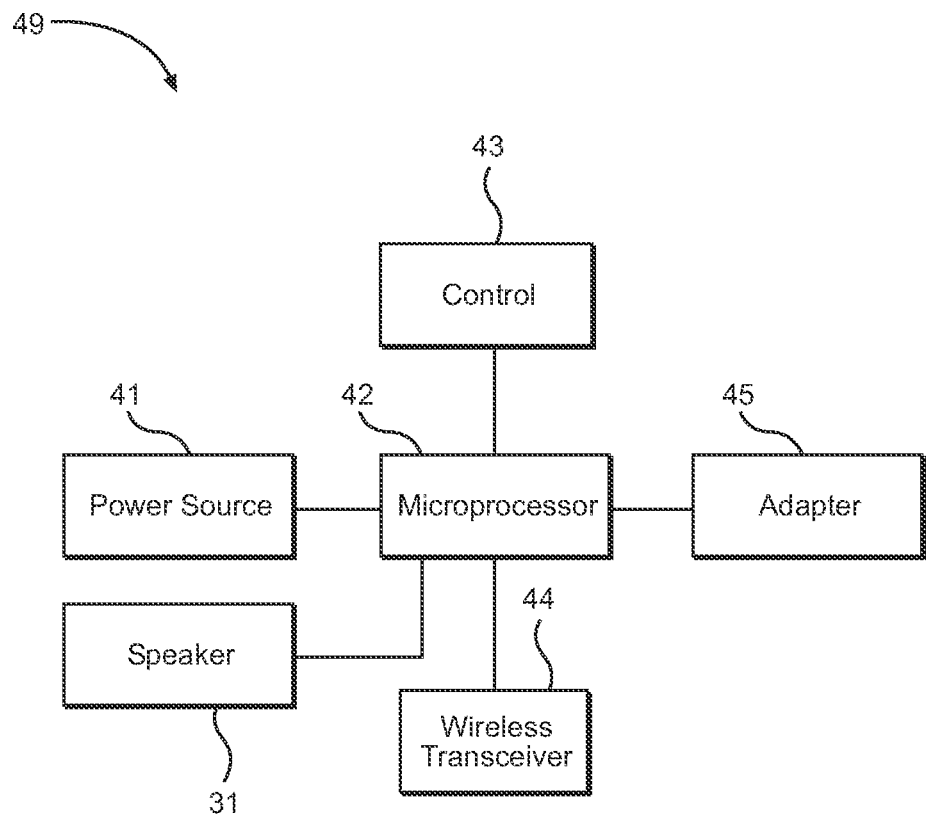
FIG. 3 shows a schematic diagram of the audio unit of the tablet holding device.

Referring now to FIG. 3, there is shown a schematic diagram of the audio unit of the tablet holding device. In some embodiments, the tablet holding device 11 further includes an audio unit 49 for playing audio from the mobile electronic device 51. The audio unit 49 comprises a microprocessor 42, a power source 41, a wireless transceiver 44, and one or more speakers 31. The audio unit 49 is adapted to communicate with a tablet or other mobile electronic device so that audio from the device can be played via the audio unit 49. Preferably, the audio unit 49 and tablet communicate wirelessly. However, in alternate embodiments, the audio unit further includes an adapter 45 adapted to place the audio unit 49 and tablet in wired connection via an electrical cable. Further, embodiments having an adapter

45 may further allow the tablet to be charged. The audio unit 49 further includes one or more controls 43 for adjusting the settings of the audio unit 49, such as a power switch, and volume or level controls.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An electronic device holding apparatus, comprising:
   a base portion having a front end and a rear end;
   an upper portion having a front end and a rear end;
   wherein said upper portion is removably securable to said base portion such that said upper portion is disposed directly above said base portion such that said base portion and said upper portion form a cavity;
   a mobile electronic device holder disposed on said front end of said upper portion adapted to removably secure a mobile electronic device therein; and
   an audio unit comprising a microprocessor, one or more speakers, a power source, and a wireless transceiver, such that said audio unit is adapted to wirelessly communicate with said mobile electronic device so as to play audio from said mobile electronic device.

2. The tablet holding device of claim 1, wherein said base portion comprises padding thereon.

3. The tablet holding device of claim 1, wherein said base portion comprises a base panel disposed in a horizontal orientation and a rear panel disposed in a vertical orientation such that it is substantially perpendicular to said base panel.

4. The tablet holding device of claim 1, wherein said upper portion comprises an upper panel pivotally affixed to a lower panel via a hinge.

5. The tablet holding device of claim 4, wherein said second panel includes a hook thereon adapted to removably secure said upper portion to a support surface.

6. The tablet holding device of claim 4, wherein said lower panel of said upper portion comprises one or more fasteners on a lower end thereof, wherein said one or more fasteners are adapted to be removably secured to said base portion.

7. The tablet holding device of claim 1, wherein said mobile electronic device holder comprises an arm having a first end and a second end, wherein a first end is pivotally affixed to a front end of said upper portion and wherein said second end includes a support on which a mobile electronic device can be positioned.

8. The tablet holding device of claim 7, wherein said mobile electronic device holder comprises a plurality of fingers extending outward from said support, wherein said plurality of fingers are adapted to engage the sides of a mobile electronic device so as to secure said mobile electronic device.

* * * * *